(12) United States Patent
Dobson

(10) Patent No.: US 10,932,577 B2
(45) Date of Patent: Mar. 2, 2021

(54) CUP-HOLDER FOR ABS PLASTIC ADIRONDACK CHAIR

(71) Applicant: Jeffrey William Dobson, Old Orchard Beach, ME (US)

(72) Inventor: Jeffrey William Dobson, Old Orchard Beach, ME (US)

( * ) Notice: Subject to any disclaimer, the term of this patent is extended or adjusted under 35 U.S.C. 154(b) by 0 days.

(21) Appl. No.: 15/231,767

(22) Filed: Aug. 8, 2016

(65) Prior Publication Data

US 2019/0357688 A1 Nov. 28, 2019

(51) Int. Cl.
*F16M 13/00* (2006.01)
*A47C 7/62* (2006.01)
*F16M 13/02* (2006.01)

(52) U.S. Cl.
CPC .......... *A47C 7/624* (2018.08); *F16M 13/022* (2013.01)

(58) Field of Classification Search
CPC ....... B60N 3/10; A47G 23/0216; A47G 23/02
USPC ................................. 248/309.1, 311.2, 311.3
See application file for complete search history.

(56) References Cited

U.S. PATENT DOCUMENTS

| | | | | |
|---|---|---|---|---|
| 4,795,211 A | * | 1/1989 | Stern | A47C 7/62 248/311.2 |
| 5,326,064 A | * | 7/1994 | Sapien | B60N 3/10 224/926 |
| 5,865,412 A | * | 2/1999 | Mason | A47C 7/62 248/214 |
| 6,010,104 A | * | 1/2000 | Hanson | A47C 1/16 248/309.1 |
| D829,637 S | * | 10/2018 | Patten | D12/415 |
| 2005/0051690 A1 | * | 3/2005 | Phillips | A47C 7/62 248/311.2 |
| 2010/0096521 A1 | * | 4/2010 | White | A47G 23/0225 248/207 |

* cited by examiner

*Primary Examiner* — Steven M Marsh
(74) *Attorney, Agent, or Firm* — Fish & Richardson P.C.

(57) ABSTRACT

The ABS plastic made cup-holder is to be retrofitted to the Adirondack chair made of similar material i.e. ABS plastic. The cup-holder provides a cup holding area with two cutouts on either side of the walls of the cup-holder and two bases to accommodate the variety of the drinks. The cup-holder has a slot to contain a normal size cellular phone. The cup-holder arm grips hold the arm of the Adirondack chair with such a strength that can support drinks of 5 lb weight. The cup holding area has one and the cellular phone slot has two drain holes at their respective floors to empty any liquid in the cup holding area or cellular slot. These features make the present invention unique, inexpensive and have greater utility.

7 Claims, 2 Drawing Sheets

_US 10,932,577 B2_

CUP-HOLDER FOR ABS PLASTIC ADIRONDACK CHAIR

RELATED APPLICATION

The present application claims the benefit of the filing date of U.S. provisional patent application titled:

BACKGROUND OF INVENTION

Field of Invention

The present invention relates generally to plastic made cup holders. More particularly, the invention relates to a cup holder that is attached to the Adirondack chairs and accommodates cellular mobile as well as a variety of bottles, cups and containers.

General Background of the Invention

The various types of cup holders have been invented some of them are built-in and others are retrofitted to the armrests of a chair or back of the seat. These are specifically popular in stadium, movie theaters seats or Adirondack chairs that made the people able to place their drinks on such cup-holders. The designs of the cup-holders for all types of chairs have been changing thanks to the varied needs of the people. Similarly, the cup-holders for the Adirondack chairs are no exceptions.

Some Adirondack chairs are available with built-in cup-holders such as the Adirondack chairs with built-in cup-holder offered by Outsunny (see https://www.amazon.com/dp/B0084EUUFO?psc=1) or by Bobs Woodworking (http://bobsyardfurniture.net/) or by Boudreaux Workshop (https://www.boudreauxsworkshop.com/adirondack---glider-furniture.html) or Panama Jack with item code PJAC100 (see www.patioliving.com). The cup-holders that may be retrofitted to the Adirondack chairs include LuxCraft Poly Stationary Cup Holder available for sale on Eric's Outdoor Furniture (http://www.ericsoutdoorfurniture.com/luxcraft-poly-stationary-cup-holder), screw-on cup-holder offered by Durable Outdoor (http://www.durableoutdoors.com/toffee-screw-on-cup-holder-attachment.php), Amish Poly Wood Cup Holder designed for wooden Adirondack chairs (https://www.amazon.com/Lumber-Folding-Adirondack-Chair-Cedar/dp/B01AWOF3S2/ref=sm_n_se_dkp_PK_pr_sea_1_1?imprToken=MWZE.d8eXf-mFPgwPFgfg&linkCode=w42&tag=amishmadeoutdoorfurniture-20&linkId=f877b4747cd7a95dc040c67f9a6a65af), add-on cup-holder to be fitted all Amish Gardens outdoor furniture with arms (http://www.outdoorpolyfurniture.com/poly-adirondack-furniture/Berlin-Gardens-PVCH0000-cupholder), and the cup holder designed by C. R. Plastic Products (http://crpproducts.com/products-accessories-a01-cupHolder.html).

In addition, Etsy.com has the designs for the cup and wine glass holders for wooden or polywood chairs (https://www.etsy.com/listing/159384542/cup-and-wine-glass-holder-for-adirondack?ref=sr_gallery_2&ga_search_query=wine+holder+chair&ga_view_type=gallery&ga_ship_to=US&ga_search_type=all).

All of the above cup-holders are particularly designed for the Adirondack chairs made of wood or polywood material that make them an expensive product. No cup-holder made of ABS plastic with cellular phone slot is available in the market that may be retrofitted to the ABS plastic Adirondack chairs.

BRIEF SUMMARY OF DESCRIPTION

The cup-holder is made of ABS plastic, making it a cheap, yet very durable product, to be retrofitted to the Adirondack chair made of ABS plastic, also made in a mold. The cup-holder provides a cup holding area with two cutouts on either side of the walls of the cup-holder and two bases to accommodate the drinks of different sizes and shapes. The cup-holder has a cellular phone slot to contain a normal size cellular phone. The cup-holder arm has two grips which hold the inner side of the arm of the Adirondack chair with such strength that can withstand up to a 51$b$ drinks. The cup holding area has one and the cellular phone slot has two holes at their respective floors to drain out the liquid. These features distinguish the present invention from the prior products.

DETAILED DESCRIPTION OF THE INVENTION

Figure 1:
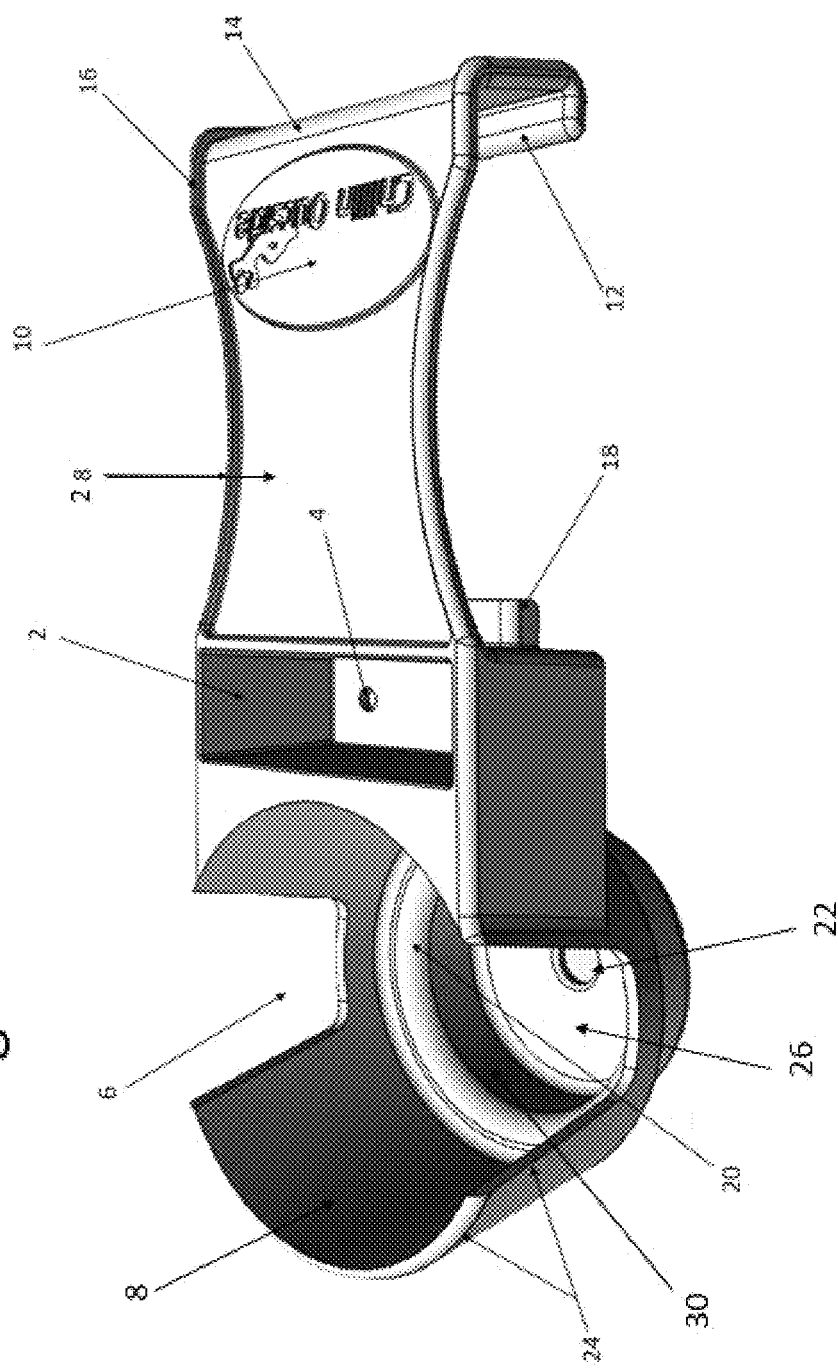
FIG. 1 is a perspective view of showing the upper side present invention.

FIG. 1 illustrates a cup-holder which is to be made of ABS plastic and retrofitted to either of the arms of an Adirondack chair. The first level of the cup holder rim 8, angled at 10 degrees with measurement 66.7 millimeter is designed to accommodate the size of most of the larger drinks in the market. The two cut-outs 6 are made on both sides of the cup-holder so that the cup-holder may be used on either side of the Adirondack chair arm to facilitate both the left-handed and right-handed users.

The cup holding area has two bases; first, the upper cup holding base 20 and, second, the lower level cup holding base 26. The upper cup holding base allows for larger drinks to rest on the ridge of the upper cup holding base 20. The lower level cup holder 26 supports narrower containers or bottles to rest on it 26. The angles of the plastic 24 on both the cutouts for the cup arms and on the upper rim of the cup holder cylinder 24 allows any liquid in the cup-holder to be channeled to the bottom of the lower level cup holding base 26 and eventually drained out through the drain hole 22.

The cup-holder also has a cellular phone slot 2 with a depth of 45.1 millimeter to contain a normal sized cellular phone. The cut-outs 6 are made on both sides of the cup-holder, angled at 21.2 degrees with the measurement of 50.8 mm, so that the cup handle of the cup may be placed.

Figure 2:
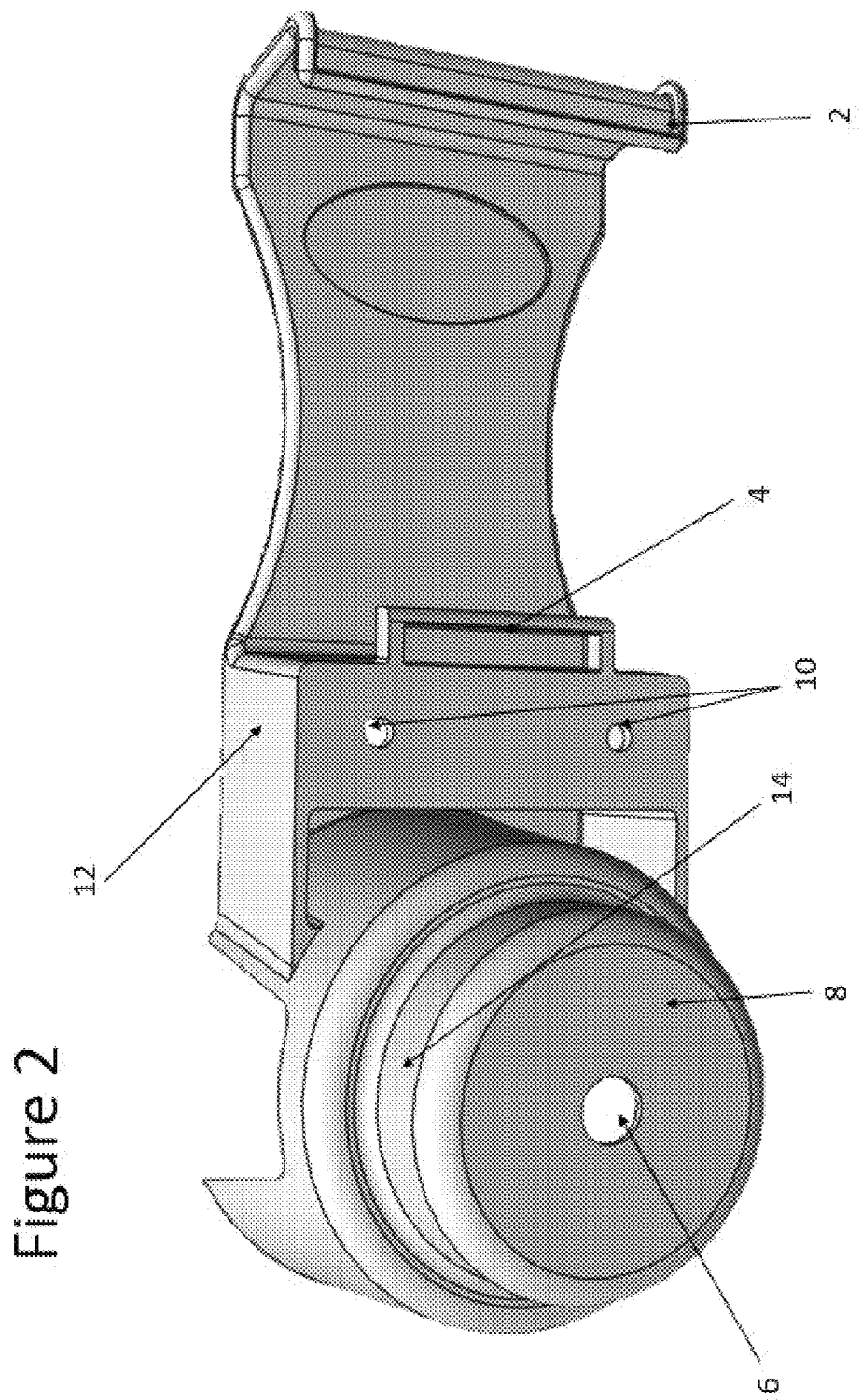
FIG. 2 is a perspective view of the lower side of the present invention.

On the rear of the cup-holder, there is a space to put the brand logo 10. The inner grip 12 is designed for grabbing and holding the cup-holder onto the inner side of the arm of the Adirondack chair with the same role played by the outer grip 18. The inner grip 12 and outer grip 18 make a jaw like shape which holds the arm of the Adirondack chair while it slides into the place and prevents it from popping up. The inner grip 12 has an angle of 75 degrees, and measurements of inner and outer grip (12 and 18) are the same which is 16.9×9.6 millimeter. Similarly, the inner gripping hook of the cup-holder 14 with the size 88.9 millimeter across allows a larger grip onto the Adirondack chair arm giving it more strength to grip. The combined grip of the inner grip 12 and outer grip 18 can withstand weight up to 5$lb$ drinks To add an additional rigidity to the cup-holder arm, a ridge 16 with the size of 3.175 millimeter is made around the arm area. 28) Expansion arm of the cup holder, extending from the otter grip to the inner grip and other the width of the arm of the chair, 28 is an Expansion arm of the cup holder, extending from the otter grip to the inner grip and other the width of the arm of the chair. 30 Second level of the cup holder, allowing for taller, narrower drinks to be held (soda and vitamin cans, bottles etc.) measuring 73.7 mm round and 25.4 mm deep In FIG. 2, it is shown in detail that the arm of the cup-holder extends from the outer grip 2 to the inner grip 4 to embrace the arm of the Adirondack chair. The hole at the bottom of the cup-holder 6, with the size 12.7 millimeter on the lower level cup holding base 8, drains out any liquid to keep the area inside the cup-holder dry and clean. The similar two drain holes 10 exist at the bottom of the cellular phone slot 12 to drain out the liquid so that the cellular phone does not come in contact with liquid that may have entered into the slot 12 due to spills or rain.

The second level of the cup holding base 14, with a measurement of 73.7 millimeter round and 25.4 millimeter deep, allows the taller and narrower cups, cans or bottles, such as soda bottles and vitamin cans, to be held.

I claim:

1. A cup-holder that is configured to be attached to a chair, the cup-holder comprising:
    a cup-holding area having two different sized bases, an upper level cup holding base and a lower level cup holding base;
    cup-holder's arm that extends away from the cup-holding area and includes an inner end and an outer end, wherein the outer end is located closer to the cup-holding area than the inner end;
    an inner grip located at the inner end of the cup-holder's arm and that extends downwards away from the cup-holder's arm,
    wherein a first angle formed where the inner grip and the cup-holder's arm connect is approximately 100 degrees;
    wherein a second angle formed where the inner grip bends both inwards towards the cup-holding area and upwards towards the cup-holder's arm is approximately 75 degrees;
    and an outer grip located at the outer end of the cup-holder's arm and that extends downwards away from the cup-holder's arm,
    wherein the inner grip and the outer grip form a jaw that has an opening that is both wider than a first portion of an arm of the chair that is closer towards a back of the chair and narrower than a second portion of the arm of the chair that is closer towards a front of the chair,
    wherein a size of the opening is such that the first portion of the arm passes through the opening and, after the cup-holder is slid on the arm away from the back of the chair to the second portion of the arm, the second portion of the arm is prevented from passing through the opening; and
    a rectangular cellular phone slot located between the cup-holding area and the cup-holder's arm.

2. The cup-holder in accordance with the claim 1, wherein the cellular phone slot is of the size to contain a normal sized cellular phone and forms two draining hole at a floor of the cellular phone slot.

3. The cup-holder of claim 1, wherein the cup-holding area makes a conical cylinder shape that includes the upper level cup holding base and the lower level cup holding base.

4. The cup-holder of claim 3, wherein walls of the conical cylinder of the cup-holding area have two cutouts on the opposite sides of each other.

5. The cup-holder of claim 3, wherein one draining hole is formed at a floor of the conical cylinder.

6. The cup-holder of claim 1, wherein the cup-holder's arm has a place on an upper side of the arm for a brand logo.

7. The cup-holder of claim 6, wherein a comparatively thick ridge is made around the cup-holder's arm.

* * * * *